United States Patent
Saitoh

(10) Patent No.: US 6,940,311 B2
(45) Date of Patent: Sep. 6, 2005

(54) DATA TRANSMISSION SYSTEM

(75) Inventor: Hiroshi Saitoh, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 72 days.

(21) Appl. No.: 10/703,522

(22) Filed: Nov. 10, 2003

(65) Prior Publication Data

US 2005/0102455 A1 May 12, 2005

(51) Int. Cl.[7] ......................................... H09K 19/094
(52) U.S. Cl. ........................... 326/86; 326/82; 326/90; 326/37
(58) Field of Search ............................. 326/21, 30, 38, 326/47, 82, 86, 90

(56) References Cited

U.S. PATENT DOCUMENTS

| | | | |
|---|---|---|---|
| 6,477,609 B1 | 11/2002 | Reiss et al. | |
| 6,496,517 B1 | 12/2002 | Gehman et al. | |
| 6,760,802 B2 * | 7/2004 | Jahnke et al. | 710/305 |
| 2002/0186043 A1 * | 12/2002 | Shibom et al. | 326/41 |

FOREIGN PATENT DOCUMENTS

JP  2002-123484  4/2002

* cited by examiner

*Primary Examiner*—Anh Q. Tran
(74) *Attorney, Agent, or Firm*—Nixon Peabody LLP; Donald R. Studebaker

(57) ABSTRACT

A data transmission system includes a first bus; a first bus master coupled to the first bus; a second bus master coupled to the first bus; a bus arbiter coupled to the first and second bus masters to provide an authorization of bus master operation to the first and second bus masters selectively; and a bus request holding circuit, which is coupled between the second bus master and the bus arbiter. The bus request holding circuit holds a bus request signal supplied from the second bus master for an appropriate period of time in response to a signal from the first bus master.

6 Claims, 4 Drawing Sheets

DATA TRANSMISSION SYSTEM

TECHNICAL FIELD OF THE INVENTION

The present invention relates to a data transmission system used in a computer system.

BACKGROUND OF THE INVENTION

A conventional data bus system, such as AMBA (high performance micro-controller bus system) provided by ARM Ltd., which includes a high performance AHB bus and a peripheral APB bus. In this system, a high performance device (bus master) is coupled to the high performance AHB bus. Another bus master, such as a CPU, is also coupled to the high performance AHB bus. An AHB bus arbiter allows selectively one of those two bus masters to access the high performance AHB bus.

According to the above described conventional system, however, the CPU cannot perform any operation while the other bus master, high performance device, is accessing the high performance AHB bus. Even if an interrupt is requested to the CPU, the interrupt operation cannot be carried out until the high performance device stops sending bus request signals. If the system is designed so as that bus requests are provided with a predetermined interval, the performance of the system gets lowered.

OBJECTS OF THE INVENTION

Accordingly, it is an object of the present invention to provide a data transmission system in which data buses are efficiently controlled in data transferring operation.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to the present invention, a data transmission system includes a first bus; a first bus master coupled to the first bus; a second bus master coupled to the first bus; a bus arbiter coupled to the first and second bus masters to provide an authorization of bus master operation to the first and second bus masters selectively; and a bus request holding circuit, which is coupled between the second bus master and the bus arbiter. The bus request holding circuit holds a bus request signal supplied from the second bus master for an appropriate period of time in response to a signal from the first bus master.

Preferably, the bus request holding circuit performs a holding operation after a process of the second bus master is completed, if the second bus master is in operation when the holding operation is requested.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
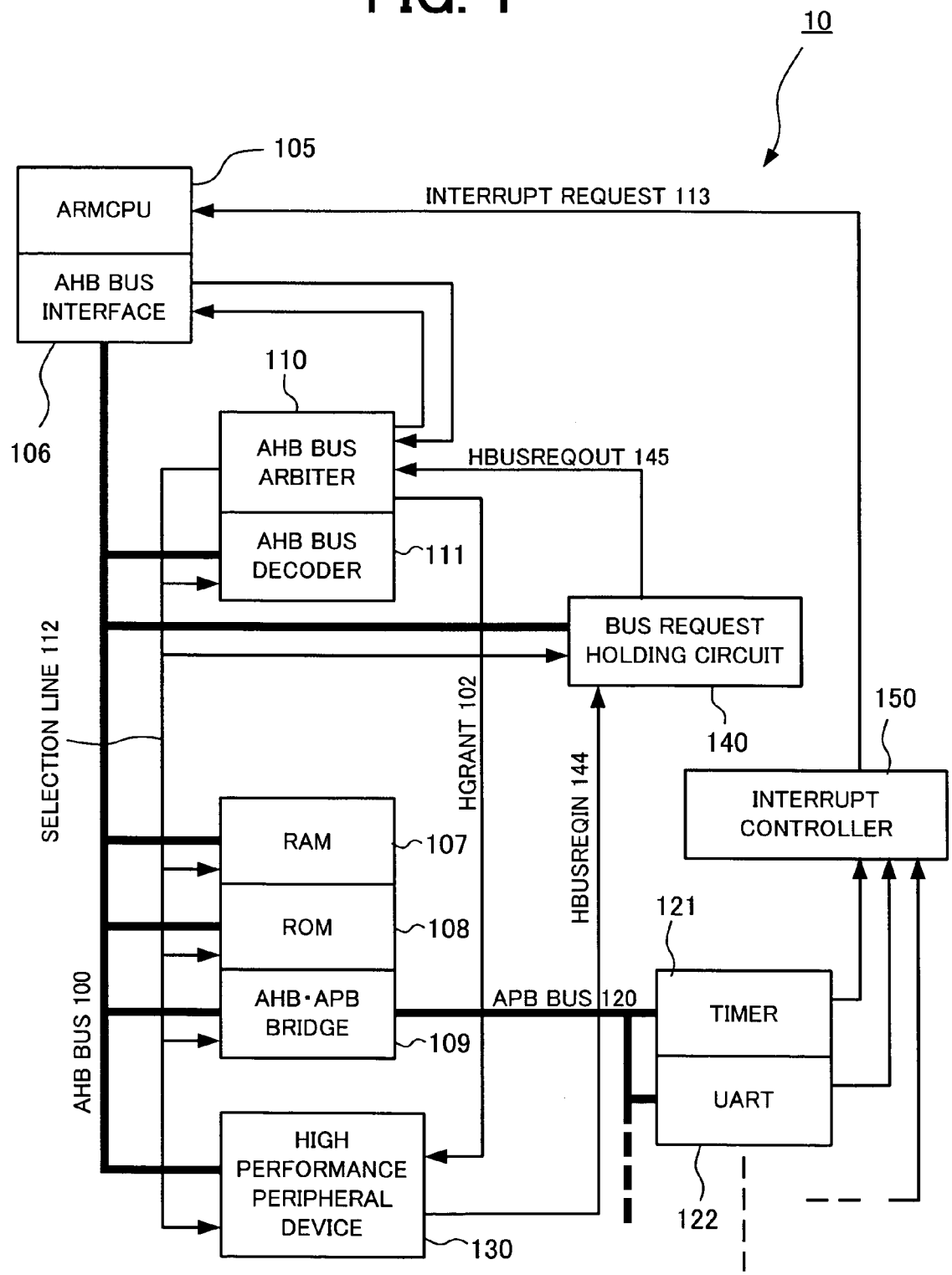
FIG. 1 is a block diagram showing a data transmission system according to a first preferred embodiment of the present invention.

FIG. 1 is a block diagram showing a data transmission system according to a first preferred embodiment of the present invention. A data transmission system 10 includes a high performance AHB bus 100; a CPU (bus master) 105; a bus arbiter 110; a peripheral bus 120; a high performance peripheral device (bus master) 130; a bus request holding circuit 140; and an interrupt controller 150.

The CPU 105 is connected through a bus interface 106 to the high performance bus 100. The bus interface 106 is connected to the bus arbiter 110. The high performance bus 100 is connected to a RAM 107; a ROM 108; a bridge circuit 109; and a bus request holding circuit 140. An output terminal of the bus arbiter 110 is connected through a bus decoder 111 to the RAM 107, ROM 108, a bridge circuit 109, a bus request holding circuit 140 and the high performance peripheral device 130 via a selection line 112. The bridge circuit 109 is connected between the high performance bus 100 and the peripheral bus 120, which is connected to a timer 121 and a UART 122. A timer 121 and a UART 122 supplies an interrupt signal to the interrupt controller 150, which supplies an interrupt request signal 113 to the CPU 105.

The high performance peripheral device 130 supplies a bus request input signal 144 to the bus request holding circuit 140, which supplies a bus request output signal 145 to the bus arbiter 110. The bus arbiter 110 supplies an acknowledge signal 102 to the high performance peripheral device 130.

The high performance AHB bus 100 is a main memory bus. The high performance peripheral device 130, which transmit a large amount of data, and the CPU 105 are bus masters. The high performance peripheral device 130 sends a bus request signal 101 to the bus arbiter 110 to access each slave. When receiving the acknowledge signal 102 from the bus arbiter 110, the high performance peripheral device 130 is allowed to access each slave. The bus arbiter 110 controls access to a variety of slaves via the bus decoder 111 and selection line 112.

The bus 120 operates in the same manner as the high performance bus 100. The bus 120 is connected to the other bus 100 through the bus bridge circuit 109, which is a slave of the high performance bus 100.

The bus request holding circuit 140 is capable to hold a bus request signal from the high performance peripheral device 130.

Figure 2:
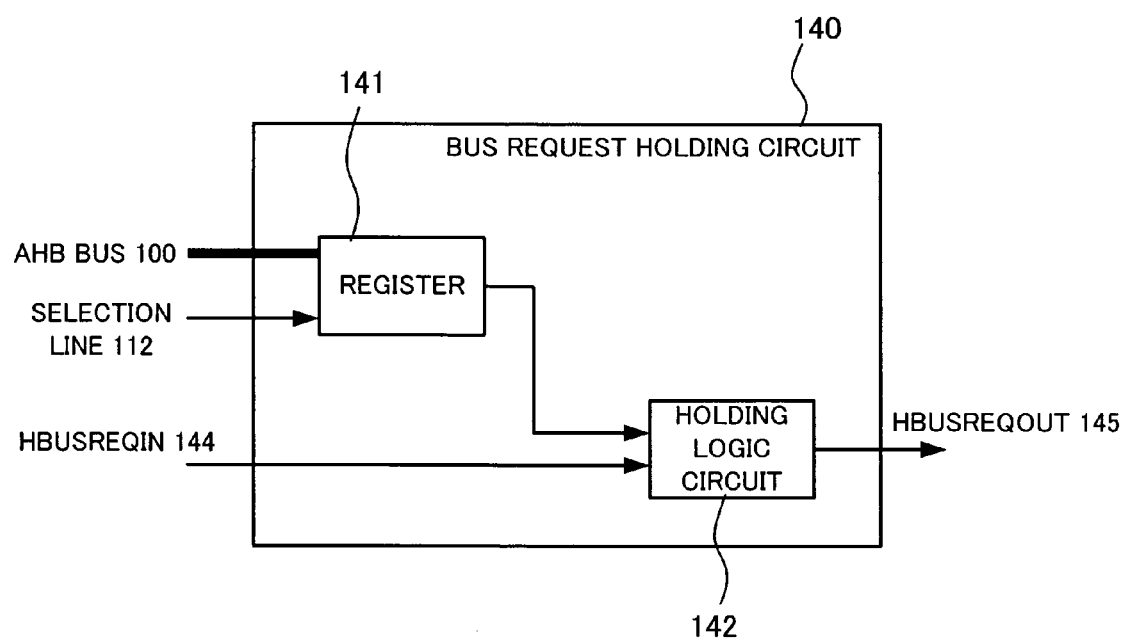
FIG. 2 is a block diagram showing a bus request holding circuit, used in the data transmission system according to the first preferred embodiment, shown in FIG. 1.

FIG. 2 is a block diagram showing the bus request holding circuit 140, used in the data transmission system 10 according to the first preferred embodiment, shown in FIG. 1. The bus request holding circuit 140 includes a register 141, which can be accessed by the high performance bus 100 and selection line 112; and a holding logic circuit 142, which holds a bus request signal 144 from the high performance peripheral device 130.

The register 141 is set at "1" to hold the bus request signal 144, which is set at "0" to cancel a holding condition of the bus request signal 144. When "0" is set at the register 141, the holding logic circuit 142 allows the bus request signal 144 to pass through to enable a bus request signal 145. In other words, a bus request is supplied to the bus arbiter 110. On the other hand, when "1" is set at the register 141, the holding logic circuit 142 disables the bus request signal 145 even if the bus request is provided.

The bus request holding circuit 140 performs a holding operation after a process of the high performance peripheral device 130 is completed, if the high performance peripheral device 130 is in operation when the holding operation is requested. When the register 141 has been set at "0" and the bus request signal 145 has been in enable state, the holding logic circuit 142 would not disable the bus request signal 145 as long as the bus request signal 144 keeps enable state "1". In other words, the holding logic circuit 142 makes the bus request signal 145 to be disable "0", when the bus request signal 144 becomes disable "0" next time.

According to the first preferred embodiment, bus requesting can be controlled by the CPU 105, so that the CPU 105 can have a priority of operation without lowering the system performance. In addition, the bus request holding circuit 140 can wait holding of bus request until the current job of the high performance peripheral device 130 is completed. As a result, it is prevented to repeat the same processing, which is interrupted.

Figure 3:
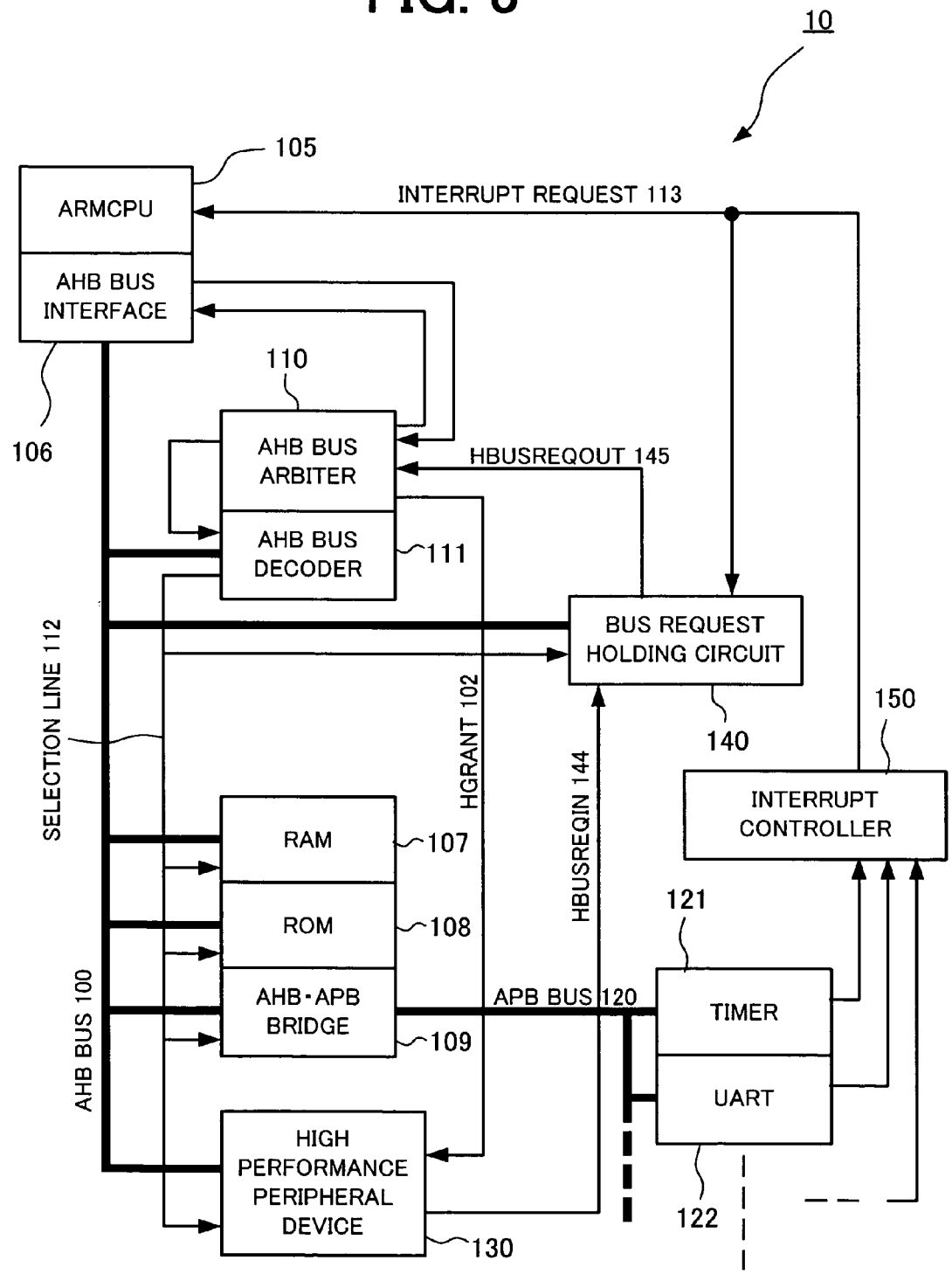
FIG. 3 is a block diagram showing a data transmission system according to a second preferred embodiment of the present invention.

FIG. 3 is a block diagram showing a data transmission system according to a second preferred embodiment of the present invention.

Figure 4:
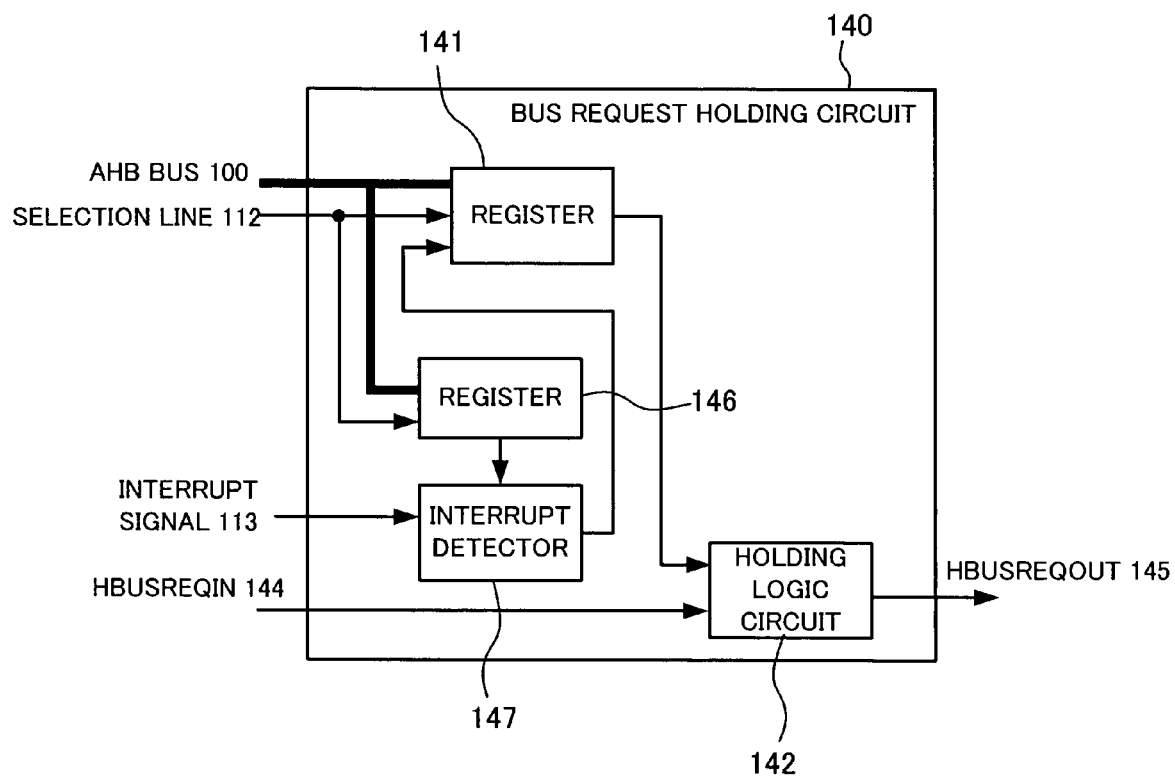
FIG. 4 is a block diagram showing a bus request holding circuit, used in the data transmission system according to the second preferred embodiment, shown in FIG. 3.

FIG. 4 is a block diagram showing a bus request holding circuit, used in the data transmission system according to the second preferred embodiment, shown in FIG. 3. In FIGS. 3 and 4, the same or corresponding elements to those in FIGS. 1 and 2 are represented by the same reference numerals, and the same description will not be repeated to avoid redundancy.

According to the system 10, shown in FIG. 3, an interrupt controller 150 is designed to supply an interrupt signal 113 to a bus request holding circuit 140. The bus request holding circuit 140 is operable in accordance with a high performance bus 100 and selection line 112 and the interrupt signal 113, supplied from the interrupt controller 150.

The bus request holding circuit 140 further includes another register 146 and an interrupt detector 147. Input terminals of the register 146 are connected to the bus 100 and the selection line 112. An output terminal of the register 146 is coupled to an input terminal of the interrupt detector 147. Another input terminal of the interrupt detector 147 is connected to an interrupt controller 150 to receive the interrupt signal 113. An output terminal of the interrupt detector 147 is coupled to an input terminal of a register 141.

According to the second preferred embodiment, the bus request holding circuit 140 can hold a bus request signal HBURSEQIN 144 in accordance with the interrupt signal 113, which may represent interrupt requests of peripheral devices or external devices. The register 146 can be set at "1" or "0" in accordance with a bus 100 and selection line 112.

In operation, the register 146 is set at "1" according to a bus 100 and selection line 112 in order to set the register 141 at "1". When an interrupt signal 113 is detected while the register 146 is set at "1", the interrupt detector 147 set the register 141 at "1". In this case, the bus request holding circuit 140 operates in the same manner as the first preferred embodiment. On the other hand, when the register 146 is set at "0" according to bus 100 and selection line 112, the bus request signal HBURSEQIN 144 is not held in response to an interrupt signal 113.

As described above, according to the second preferred embodiment, the bus request signal 144 can be held in response to an interrupt signal 113. As a result, disadvantages that happen when the bus request has a higher priority than the interrupt request can be solved. And therefore, the system can be operated reliably.

The present invention is applicable to a system LSI, having a data system such as AMBA. A plurality of bus masters may be used in the system LSI in addition to a CPU. In this case, the number of registers holding bus request signals can be increased in accordance the number of bus masters. Operation of holding a bus request signal and canceling holding state of a bus request signal can be controlled using a terminal of a LSI, coupled to the holding logic circuit 142.

What is claimed is:

1. A data transmission system, comprising:
   a first bus;
   a first bus master coupled to the first bus;
   a second bus master coupled to the first bus;
   a bus arbiter coupled to the first and second bus masters to provide an authorization of bus master operation to the first and second bus masters selectively; and
   a bus request holding circuit, which is coupled between the second bus master and the bus arbiter, wherein
   the bus request holding circuit holds a bus request signal supplied from the second bus master for an appropriate period of time in response to a signal from the first bus master.

2. A data transmission system according to claim 1, wherein
   the bus request holding circuit performs a holding operation after a process of the second bus master is completed, if the second bus master is in operation when the holding operation is requested.

3. A data transmission system according to claim 1, wherein
   the bus request holding circuit comprises a first register coupled to the first bus and the first bus master; and a logic circuit, which decides holding/non-holding of the bus request signal in accordance with an output signal of the first register.

4. A data transmission system according to claim 3, wherein
   the bus request holding circuit further comprises a second register coupled to the first bus and the first bus master; and an interrupt detector coupled to the first and second registers to detect an interruption request, wherein
   the first register is operable in accordance with the holding request signal from the first bus master or with an output signal of the interrupt detector.

5. A data transmission system according to claim 1, wherein
   the first bus master is a CPU and the second bus master is a high performance peripheral device.

6. A data transmission system according to claim 1, further comprising:
   a second bus;
   a bus bride circuit coupled to the first bus and second bus;
   a peripheral device coupled to the second bus, wherein
   the first bus is a higher performance main bus to be connected to a memory device, and the second bus is a lower performance bus.

* * * * *